US008638704B2

(12) United States Patent
Gupta et al.

(10) Patent No.: US 8,638,704 B2
(45) Date of Patent: Jan. 28, 2014

(54) SLEEP MODE POWER SAVING IN A WIRELESS COMMUNICATION DEVICE

(75) Inventors: Maruti Gupta, Portland, OR (US); Elad Levy, New Ziona (IL); Shantidev Mohanty, Santa Clara, CA (US); Aran Bergman, Givatayim (IL)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 13/039,131

(22) Filed: Mar. 2, 2011

(65) Prior Publication Data
US 2011/0317602 A1 Dec. 29, 2011

Related U.S. Application Data

(60) Provisional application No. 61/311,174, filed on Mar. 5, 2010.

(51) Int. Cl.
| | | |
|---|---|---|
| G08C 17/00 | (2006.01) | |
| H04W 4/00 | (2009.01) | |
| H04J 3/16 | (2006.01) | |
| H04B 1/38 | (2006.01) | |
| H04B 1/16 | (2006.01) | |

(52) U.S. Cl.
USPC ........... 370/311; 370/328; 370/468; 455/574; 455/343.4

(58) Field of Classification Search
None
See application file for complete search history.

(56) References Cited

U.S. PATENT DOCUMENTS

| | | | |
|---|---|---|---|
| 2008/0186892 A1* | 8/2008 | Damnjanovic | 370/311 |
| 2011/0053657 A1* | 3/2011 | Jl | 455/574 |
| 2011/0103315 A1* | 5/2011 | Camp et al. | 370/329 |
| 2011/0235547 A1* | 9/2011 | Fang et al. | 370/254 |
| 2012/0014245 A1* | 1/2012 | Park et al. | 370/216 |

FOREIGN PATENT DOCUMENTS

WO   WO 2010022577 A1 * 3/2010

* cited by examiner

*Primary Examiner* — Faruk Hamza
*Assistant Examiner* — Cassandra Decker
(74) *Attorney, Agent, or Firm* — Schwegman, Lundberg & Woessner, P.A.

(57) ABSTRACT

Embodiments of methods for optimizing power savings in a wireless device by maintaining sleep in sub-frames of an extended Listen Window, in an I.E.E.E. 802.16m communication system. In one embodiment, the Listen Window is extended into the Sleep Window, wherein at least one sub-frame remains designated for sleep. The power savings may be used when HARQ retransmissions are scheduled or for VoIP transmissions and so forth.

20 Claims, 7 Drawing Sheets
(1 of 7 Drawing Sheet(s) Filed in Color)

Proposed sub-frame level extension of Listen window

FIG. 5 Proposed sub-frame level extension of Listen window

SLEEP MODE POWER SAVING IN A WIRELESS COMMUNICATION DEVICE

PRIORITY CLAIM

This application claims priority under 35 U.S.C. 119(e) to U.S. Provisional Patent Application Ser. No. 61/311,174, filed Mar. 5, 2010, which is incorporated herein by reference in its entirety.

TECHNICAL FIELD

The present invention pertains to wireless communications. Some embodiments pertain to wireless networks.

BACKGROUND

Power conservation and savings are considerations in battery-powered mobile and wireless devices. As wireless technologies continue to improve the data rates supporting a large variety of applications over a wide variety of mobile devices, these considerations may become complex. Both IEEE 802.16e and IEEE 802.16m standards define sleep mode operations for power saving at mobile stations. Optimizing wireless communications and improving sleep operations may be used to improve the power saving gains in such devices.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, the sequence of operations may vary, and features of some embodiments may be included in or substituted for those of others. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Various embodiments are described herein relating to methods to improve power savings using Sleep mode in IEEE 802.16m standards, which includes operations and communications including Sleep mode, Hybrid Automatic Repeat Request (HARD), Voice over IP (VoIP), and other concepts related to mobile broadband access technologies.

Figure 1:
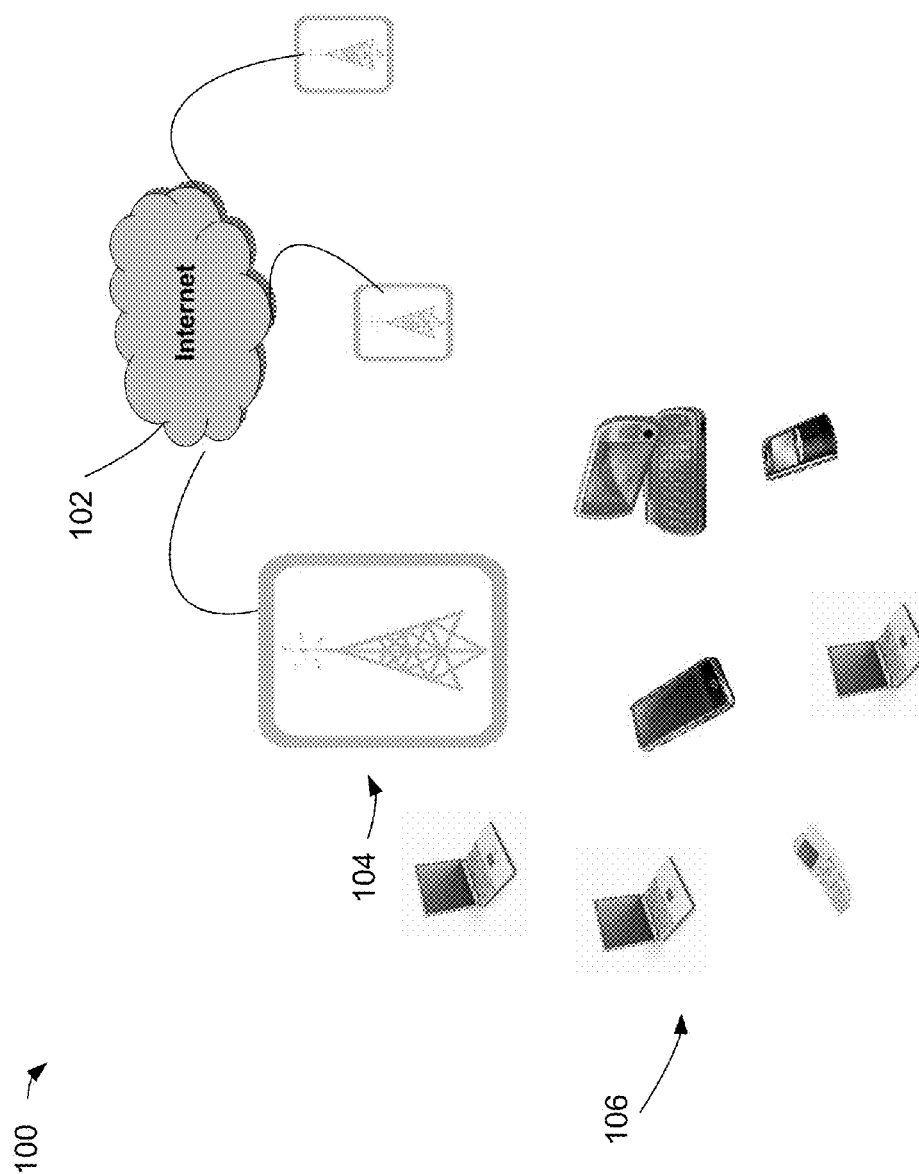
FIG. 1 illustrates a wireless network in accordance with some example embodiments.

FIG. 1 illustrates a wireless network 100 where communication are processed through a network, such as the Internet 102, according to some embodiments, having multiple nodes or Base Stations (BS) 104 coupled between the Internet 102 and various wireless communications devices 106, including cellular devices, laptop computers, tablet devices, e-Reader devices, and other devices having wireless capabilities. The network 100 may also include a Wireless Local Area Network (WLAN) or other network having a router for processing transmissions within the WLAN.

In some embodiments, network 100 may communicate in accordance with specific communication standards, such as the Institute of Electrical and Electronics Engineers (IEEE) standards including IEEE 802.16m standards, entitled "Advanced Air Interface with data rates of 100 Mbit/s mobile & 1 Gbit/s fixed," and currently pending in IEEE working groups, although the scope of the invention is not limited in this respect as they may also be suitable to transmit and/or receive communications in accordance with other techniques and standards.

In some embodiments where network 100 communicates using OFDM, the communication signals may comprise a plurality of orthogonal subcarriers. Each subcarrier of the communication signals may have a null at substantially a center frequency of the other subcarriers and/or each subcarrier may have an integer number of cycles within a symbol period, although the scope of the invention is not limited in this respect.

In some embodiments, network 100 may communicate in accordance with specific communication standards, such as the Institute of Electrical and Electronics Engineers (IEEE) standards including IEEE 802.16m standards, although the scope of the invention is not limited in this respect as they may also be suitable to transmit and/or receive communications in accordance with other techniques and standards.

In some embodiments, network components may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems" —Local Area Networks—Specific Requirements—Part 11 "Wireless LAN Medium Access Control (MAC) and Physical Layer (PHY), ISO/IEC 8802-11: 1999," and Metropolitan Area Networks—Specific Requirements—Part 16: "Air Interface for Fixed Broadband Wireless Access Systems," May 2005 and related amendments/versions.

As described herein, methods to improve power savings in a network, such as network 100 of FIG. 1, supporting a 802.16m standard defined specification of a Sleep mode, are provided which enable an Active Mobile Station (AMS) to sleep at the sub-frame level during extended Listening interval such as for HARQ re-transmissions.

According to 802.16m standard specifications, a Sleep mode may be implemented to allow an MS to operate pre-negotiated periods of absence from a serving BS. This is a power saving operation which is managed for active connections to the MS. Sleep mode may be activated when an MS is in a "Connected State." When Sleep mode is active, the MS is provided with a series of alternate sequence of "Listen Windows" and "Sleep Windows." The Listen Window is the window of time when the MS is available for communication with a BS, or Active BS (ABS), including for exchange of control signaling as well as other data and information. In contrast, the Sleep Window is the window of time when the MS is not available for specific communications with the BS. Sleep Windows and Listen Windows may be dynamically adjusted according to operation and control of the MS, such as for data transmission and/or Medium Access Control (MAC) layer control and signaling transmissions.

Figure 2:
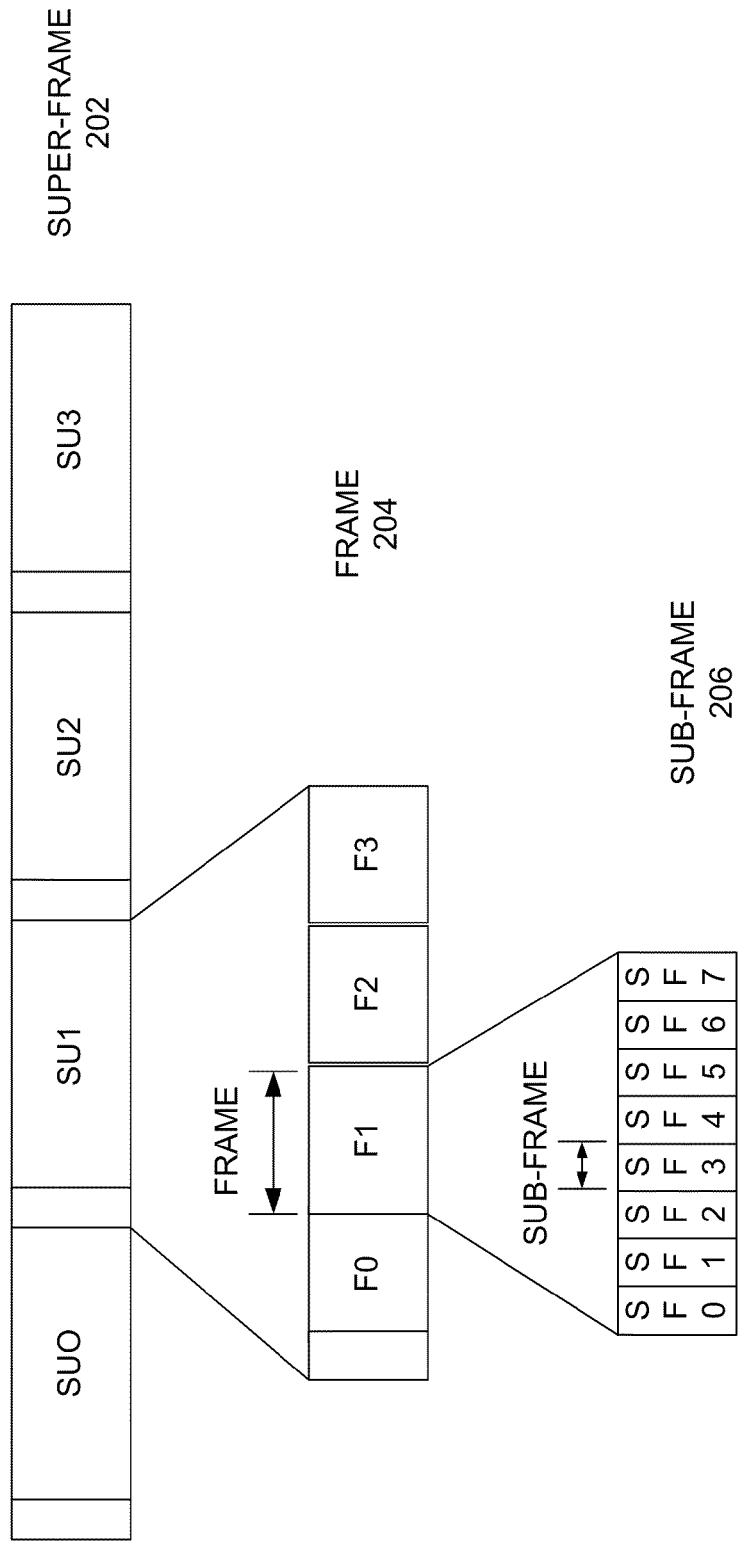
FIG. 2 illustrates a frame structure for communication in accordance with the IEEE 802.16m communication standard.

Communications within the network 100 are according to the 802.16m specification, having a frame structure as illustrated in FIG. 2. Transmissions are provided according to a general frame structure 200. Data is organized into a hierarchy of super-frames 202, frames 204, sub-frames 206, and OFDM symbols (not shown). In some embodiments, super-frames 202 last 20 ms and contain four 5 ms frames 204, each of which contains 8 sub-frames 206. There are other configurations which include a variable number of sub-frames.

As presented herein, and according to various embodiments, a unit of a Sleep Cycle is in frames, and includes a Sleep Window of frames or portions of frames, sub-frames, that are in Sleep mode and frames or portions of frames, sub-frames, that are in Active mode, referred to as a Listen Window. The start of the Listen Window is aligned at a frame boundary. A Sleep Cycle is then the sum of a Sleep Window and a Listen Window. In IEEE 802.16m, Sleep may be also optimized at the granularity of a sub-frame within the Listen Window frames to further improve power savings. This sub-frame level Sleep is communicated to the MS by the use of a bitmap; the bitmap identifies which sub-frame(s) within a particular frame is for Listening, and which sub-frames are for sleeping. In one embodiment, the bit corresponding to a given sub-frame is set to 1 for Listening during this sub-frame, while the bit is set to 0 for Sleep during that corresponding sub-frame. In one embodiment, all sub-frames within a Sleep window are for Sleep mode, as detailed hereinbelow and further illustrated in FIG. 3. In some embodiments, it is possible to extend the Listen Window according to the conditions specified in IEEE802.16m standard. In such cases, the Listen Window before extension may be described as the default Listen Window. In some embodiments, the MS or the BS may request a change of a Sleep Cycle through explicit MAC control signaling. During the MS Listen Window, a BS may transmit the traffic indication message intended for one or multiple MS according to the sleep negotiation messages.

Further, the embodiments presented herein are applicable to communications implementing HARQ retransmission techniques. HARQ is used in 802.16m to ensure all packets are transmitted and correctly received. While there are several variations of HARQ, the 802.16m specifies a system based on stop-and-wait. This means that when each frame is sent, the sender waits until it receives an ACK (acknowledgement) before sending the next frame. Multiple HARQ channels can run in parallel (up to 16), mitigating the performance hit of waiting for an ACK before sending more data. Each of these multiple channels has a unique identifier that is determined differently for UL and DL traffic. For DL traffic, it is simply the HARQ Channel ID (ACID). For UL traffic this identifier is a combination of the ACID and the index of the sub-frame containing the HARQ data.

Within a system supporting 802.16m, various embodiments include methods to improve power savings in a network, such as network 100 of FIG. 1, supporting a 802.16m standard defined specification of a Sleep mode, by enabling the MS to sleep at the sub-frame level during extended Listening interval such as for HARQ re-transmissions. By extending the Listen Window in sub-frames, such as sub-frames 206 of FIG. 2, rather than merely for frames, such as frames 204 of FIG. 2, a refined control is enabled. These methods save energy as the MS is able to enter Sleep mode more often than in previous methods wherein the MS stayed awake during frames even when only a small percentage of Up-Link (UL) or Down-Link (DL) sub-frames were actually being utilized for transmissions/receptions. The embodiments described herein thus address the problem of wasting energy associated with wake time during all DL sub-frames instead of only a few. In some embodiments, the MS remains awake during UL sub-frames. In some embodiments, the bitmap used for the default Listen Window provides sufficient information such that no additional overhead signaling is required. This is enabled by using the same bitmap for the extension as used during the default Listen Window as described in detail hereinbelow.

A sub-frame level Sleep mode enables an MS to sleep for very short periods, for example, sub-frames when no DL/UL traffic is expected. The sub-frame level Sleep operation is however limited to the default Listen Window. A Listen Window extension is used to extend the duration of the Listen Window so that during this extension an MS in Sleep mode is able send or receive traffic without disabling Sleep mode. In previous solutions, an MS in Sleep mode was to remain awake for the entire duration of the extended Listen Window, also referred to as Listening Interval. Extension techniques of the embodiments presented herein may be used when indicated by scheduling information provided to an MS. In this case, the Listen Window may be extended by one frame or multiple frames. During this extended listening interval the MS may be scheduled to send or receive traffic in some but not all of the sub-frames, and therefore, having the MS remain awake during an entire frame (which includes multiple sub-frames) is not optimal. Additionally, in many cases, the exact sub-frames (in the extended Listen Window) during which traffic may be scheduled is known or determined. Therefore, instead of remaining awake for the entire extended listening interval, it is sufficient for the MS to remain awake only during the specific DL/UL sub-frames of the extended listening interval where the MS may send/receive traffic.

The present embodiments provide methods for enabling Sleep for a sub-frame. In various embodiments, the Listen Window may be extended in units of a frame, sub-frames. For each Listen Window extension, the MS or BS has the option to specify a bitmap that indicates the specific sub-frames during which the MS should remain awake to enable receiving/sending traffic. This sub-frame level bitmap may be same as the one used for the default Listen Window or it may be different. This bitmap may be negotiated during the setup of the Sleep Cycle itself, thus the BS may communicate either the same bitmap as used for the default Listen Window or a different one, depending upon its scheduling. This is particularly useful for deterministic periodic traffic such as VoIP.

Similarly, for HARQ retransmissions an MS may remain awake from Sleep mode MS not only in the sub-frames where for HARQ retransmission related traffic (data and control) but also in other sub-frames to allow for retransmissions. MSs availability in the sub-frames where no HARQ retransmissions are present results in unnecessary power consumption. This contribution proposes methods using which MS in sleep mode can sleep in some of the sub-frames of the extended listening interval. The listening interval may be extended for additional HARQ retransmissions for example.

As an example, VoIP traffic is used to show how enabling Listen Window extension at the sub-frame level may result in significant power savings. VoIP traffic is periodic as the MS has maximum one DL and/or UL VoIP packet every 20 ms. Using a sub-frame Sleep option, the Listen Window is designed such that the MS remains awake only for a set of DL and UL sub-frames indicated in a bitmap as detailed hereinbelow and illustrated in FIG. 3.

Now, since VoIP traffic is fairly deterministic, there is an option of either extending the Listen Window, such as by setting a Listen Window Extension Flag (LWEF) equal to 1. Note, when LWEF is equal to 0 then there is no Listen Window extension.

Figure 3:
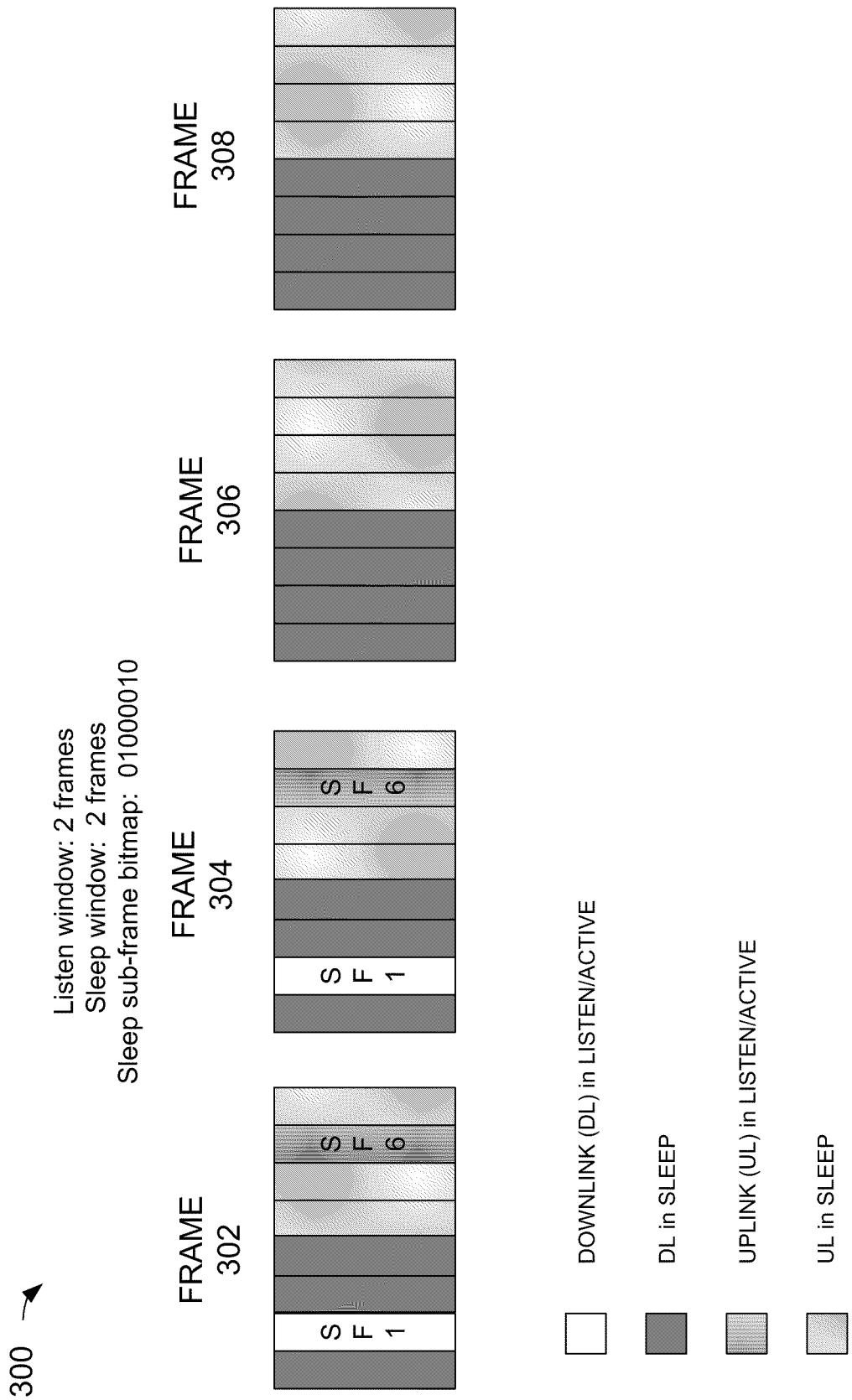
FIG. 3 illustrates an example of a Sleep and Listen window pattern at the granularity of frame and sub-frame for communication in accordance with some example embodiments.

FIG. 3 illustrates an example scenario 300 of a sequence of frames, each frame having eight sub-frames. Note that this scenario 300 occurs after the communication protocol has been negotiated between the MS and the BS. As illustrated, there are frames 302, 304, 306 and 308, each frame having a first set of sub-frames for the DL, and second set of sub-frames for the UL. Alternate embodiments may implement other configurations of DL and UL sub-frames, and FIG. 3 is provided as an example. As illustrated, in frame 302, sub-frames of the DL, SF0, SF2, and SF3 are in Sleep mode and SF1 is active in Listen mode. The bitmap for such a scenario is given as 0100 0010, where 0 represents sleep and 1 represents listen. The MS wakes during SF1 to receive the DL-MAP information from the BS. Further in frame 302, the UL sub-frames of the UL, SF4, SF5, and SF7 are in Sleep mode and SF6 is awake. In this example, the Listen Window is the first two frames 302, 304 and the Sleep Window is the second two frames, 306, 308. In the scenario 300, the MS is in Sleep mode during all sub-frames of the Sleep Window. Further, the MS is in Sleep Mode in the designated sub-frames of the Listen Window. In scenario 300 there is no extension of the Listen Window.

The following methods describe example scenarios and the corresponding MS or MS settings used to negotiate a Sleep Cycle having a Listen Window for two frames and an extension of the Listen Window into the Sleep Window to accommodate various transmissions scenarios, for example where the MS does not know the sub-frame in which data will be received. In one example, the Listen Window is extended to accommodate a retransmission of data to the MS as indicated by an HARQ status. For example, where the MS transmits a NAK HARQ message to the BS initiating a retransmission of data to the MS.

Figure 4:
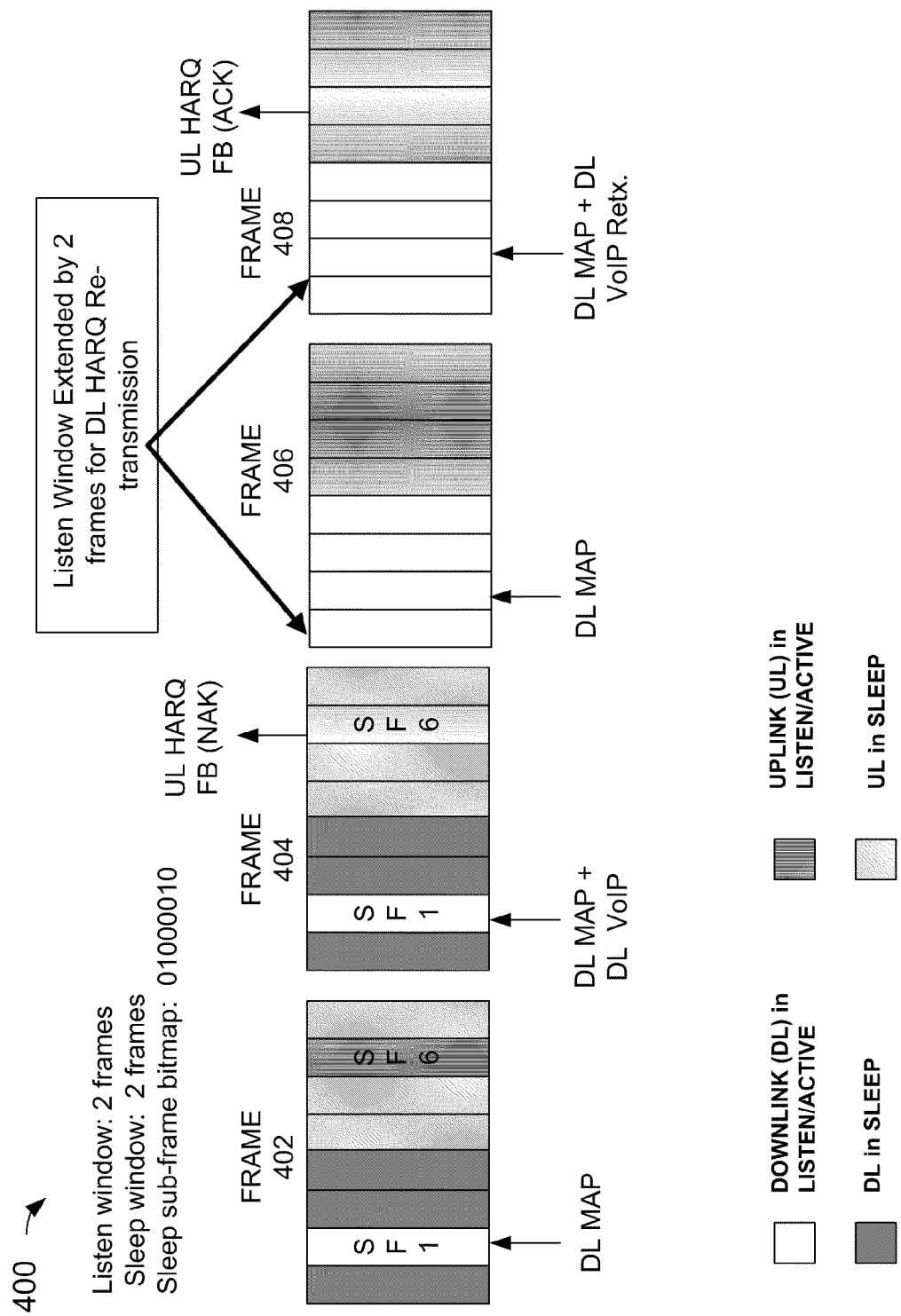
FIG. 4 illustrates an example of extension of a Listen window at the granularity of frame and sub-frame in a system supporting the IEEE802.16m standard, in accordance with some example embodiments.

In the example scenario 400 of FIG. 4, the frame structure is similar to that of scenario 300 of FIG. 3 where within a frame, four sub-frames are allocated to DL and four sub-frames are allocated to UL. The bitmap for the scenario 400 is the same, 0100 0010, and there are two frames in the Listen Window and two frames in the Sleep Window. In this example, the Listen Window is extended into the frames 406 and 408, due to an event such as a retransmission of data due to an HARQ status.

In an IEEE 802.16m communication system, DL-MAP and UL-MAP provide sub-channel allocation and other control information for the DL and UL sub-frames respectively; MAP refers to Media Access Protocol. As the MAP information is overhead, it may vary with the amount of data transmissions currently active in a network. For example, the number of system users and the amount of VoIP data may impact the size of the MAP.

Continuing with FIG. 4, in Frame 402, the DL-MAP information is received at the MS in sub-frame SF1, and the MS is sleeping until the UL sub-frame SF6, designated as a Listen sub-frame. In Frame 404, the MS receives the DL-MAP and DL-VoIP data. The MS then sleeps until sub-frame SF6 when the MS transmits the UL-HARQ feedback, which in this case is a NAK, indicating that the data was not fully received successfully and a retransmission is requested. Due to the HARQ status indicating that a retransmission will be received at the MS, the next frames 406 and 408 remain active and in Listen mode so as to receive the retransmission. The extension of the Listen Window into the Sleep Window allows the MS to receive the retransmission and to send an ACK (or NAK) HARQ message to the BS. As indicated, the DL-MAP is received in sub-frame SF1 of frames 406 and 408. In addition, the DL-VoIP retransmission, requested by the UL HARQ NAK of sub-frame SF6 of frame 404, is received in sub-frame SF1 of frame. In contrast to the scenario of FIG. 3, all sub-frames of the Sleep Window are awake for this type of Listen Window extension.

Figure 5:
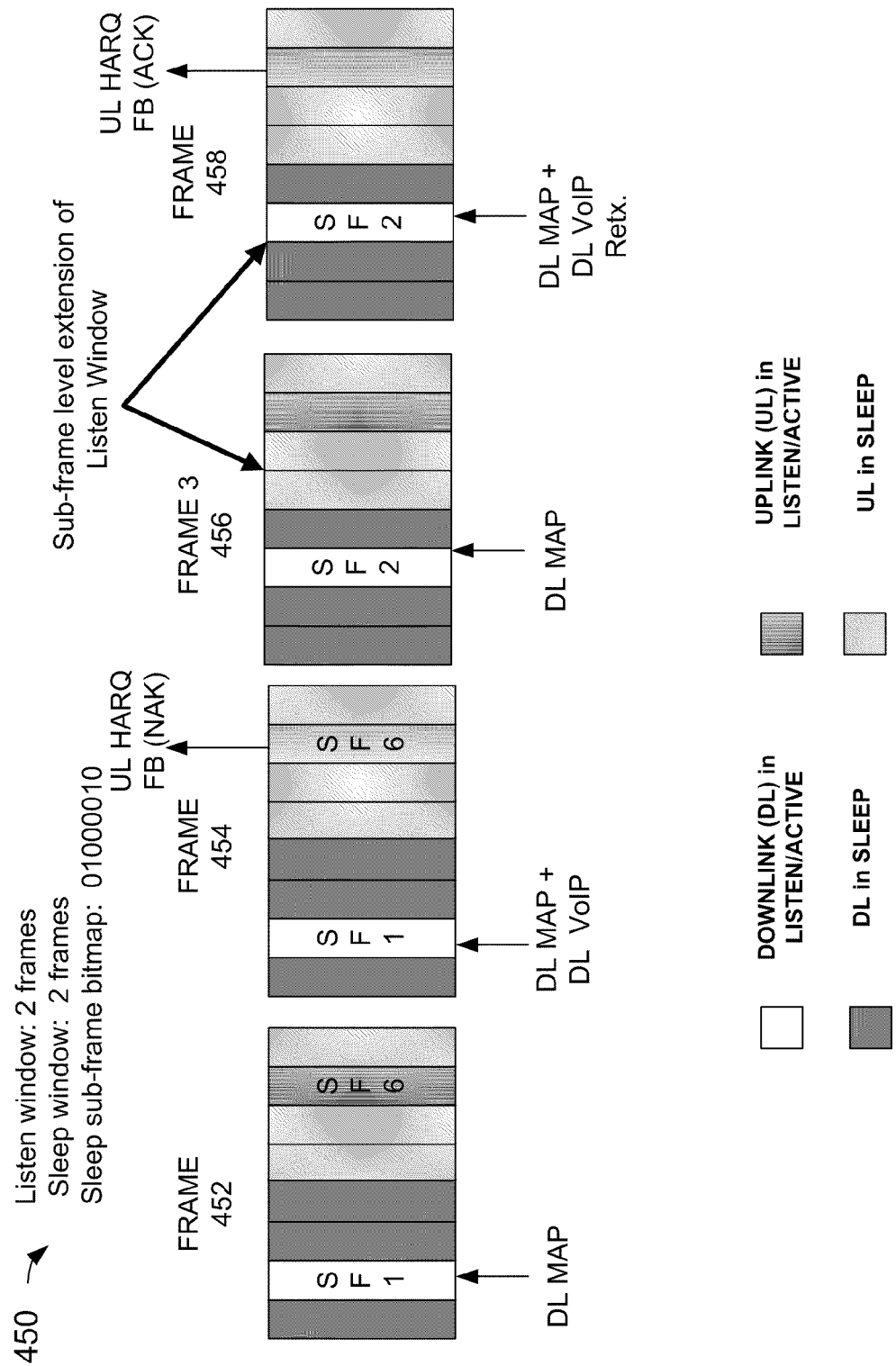
FIG. 5 illustrates an example of extension of a Listen window at the granularity of frame and sub-frame in accordance with some example embodiments.

In the example embodiment, scenario 450, illustrated in FIG. 5, the structure has two frames assigned to the Listen Window and two frames assigned to the Sleep Window, with a bitmap of 0100 0010 for default operation. Note that the bitmap is negotiated between the BS and the MS at the initiation of communications. The scenario 450 has LWEF=1, wherein the Listen Window is implicitly extended for any pending HARQ retransmissions. Alternate embodiments may specify the conditions in which the Listen Window is extended and specifically which sub-frames will be used in the extension. The frame structure is as in FIGS. 3, 4 and the scenario 450 is similar to scenario 400, wherein the default settings provide for receipt of the DL-MAP in sub-frames SF1 of frame 452 and 454 of the Listen Window. The UL sub-frames SF6 are for transmissions from the MS, and in sub-frame SF6 of frame 454 the MS sends a NAK as HARQ feedback to the BS. The BS then knows to send a retransmission of the DL-VoIP data which the MS received in SF1 of frame 454. This triggers an extension of the Listen Window beyond frames 452 and 454 into frames 456 and 458 of the Sleep Window.

Continuing with the scenario 450 of FIG. 5, the Listen Window is extended into the Sleep Window as in the previous examples, however, scenario 450 allows Sleep mode in sub-frame granularity of the extension. This is in contrast to scenarios 400, which requires that the entire frame of the extension to remain awake and effectively eliminates the Sleep Window. The scenario 450 extends the Listen Window while allowing Sleep in sub-frames of frames 456 and 458. Note, in an 802.16m system, wherein DL HARQ transmissions are asynchronous, the MS may not know the DL sub-frame that will receive the retransmission and therefore the MS should remain awake for the entire duration of the DL.

With respect to FIG. 5, consider the following sequence of events wherein an Initial Negotiation occurs in which the BS and MS negotiate how data will be sent and received. The negotiation for the scenario 450 sets a Sleep Cycle with two frames for the Sleep Window and two frames for the Listen Window, designated by setting LWEF=1. The negotiation further allows sub-frame level Sleep and designates the sub-frame assignments to be used during such extension of the Listening Window into the Sleep Window. In this case, the device is to be awake for one DL sub-frame SF2 and one UL sub-frame SF6 of the Sleep Window. In operation, when the MS is scheduled to receive a VoIP packet in a DL transmission, the MS first receives a DL-MAP in frame 452 to indicate that it has a DL-VoIP packet scheduled for delivery in the next frame 454. Further, in the next frame 454, the MS gets the DL-VoIP packet as well as the allocation in the UL sub-frame SF6 to send its HARQ ACK/NAK as feedback to the BS.

When the first DL transmission is not successful, and an HARQ retransmission is to be sent, then the Listen Window is extended by a specific duration, as originally negotiated and supported by DL-MAP information. In previous versions of IEEE 802.16m, this extension is in unit of frames, as shown in FIG. 4. In the present example scenario 450 of FIG. 5, the extension may be for a full frame to allow receipt of the DL retransmission, while allowing sub-frame Sleep mode designation. In the example scenario 450 the DL-MAP is received at the MS in sub-frame SF2. Instead of the MS being awake for an entire extended frame, the MS stays awake only to allow receipt of the sub-frame of the DL HARQ retransmission and to send an ACK/NAK during the UL sub-frame SF6 in response. The specific sub-frames which are active in the extended Listen Window may be the defined by the bitmap pattern used for a default Listen Window or a different bitmap pattern altogether. If a different bitmap pattern is used for the extended Listen Window, then this bitmap pattern can be negotiated between the MS and its serving BS. Using the same bitmap pattern is often more efficient as it saves signaling overhead. When UL HARQ transmissions are synchronous, the MS knows when to send the HARQ response and there is no need for further signaling from the BS related to this bitmap pattern. The MS wakes at the designated DL sub-frame and receives the retransmission; again the MS wakes at the designated UL sub-frame and sends the HARQ feedback response.

In another example, when the LWEF=0, instead of using a Listen Window extension for HARQ retransmission, HARQ retransmission is delayed until the next Listen Window. The operational principles of this method are given in the following example. The MS and BS negotiate a Sleep Cycle with one frame Listen Window within which a sub-frame bitmap that indicates one DL sub-frame and one UL sub-frame. When the MS gets the allocation of the UL sub-frame, the MS is thus instructed to wake in the relevant DL frame to hear the HARQ ACK/NAK. If LWEF=0, the retransmission of HARQ bursts may be granted in a next Listen Window, such as after the two sub-frames defined by a sub-frame bitmap. DL allocation will be granted in MAPs and so will the UL allocation as well. This means that both the retransmission and the new packet may need to be scheduled in the same sub-frame in the next Listen Window. If VoIP is supported using such a method, there is extra delay involved, but it may not require any changes except that the HARQ retransmissions are delayed until the next Listen Window, which is already the default behavior in the standard. Also, the same sub-frame bitmap as used for a single transmission may be used for HARQ retransmissions as well.

Figure 6:
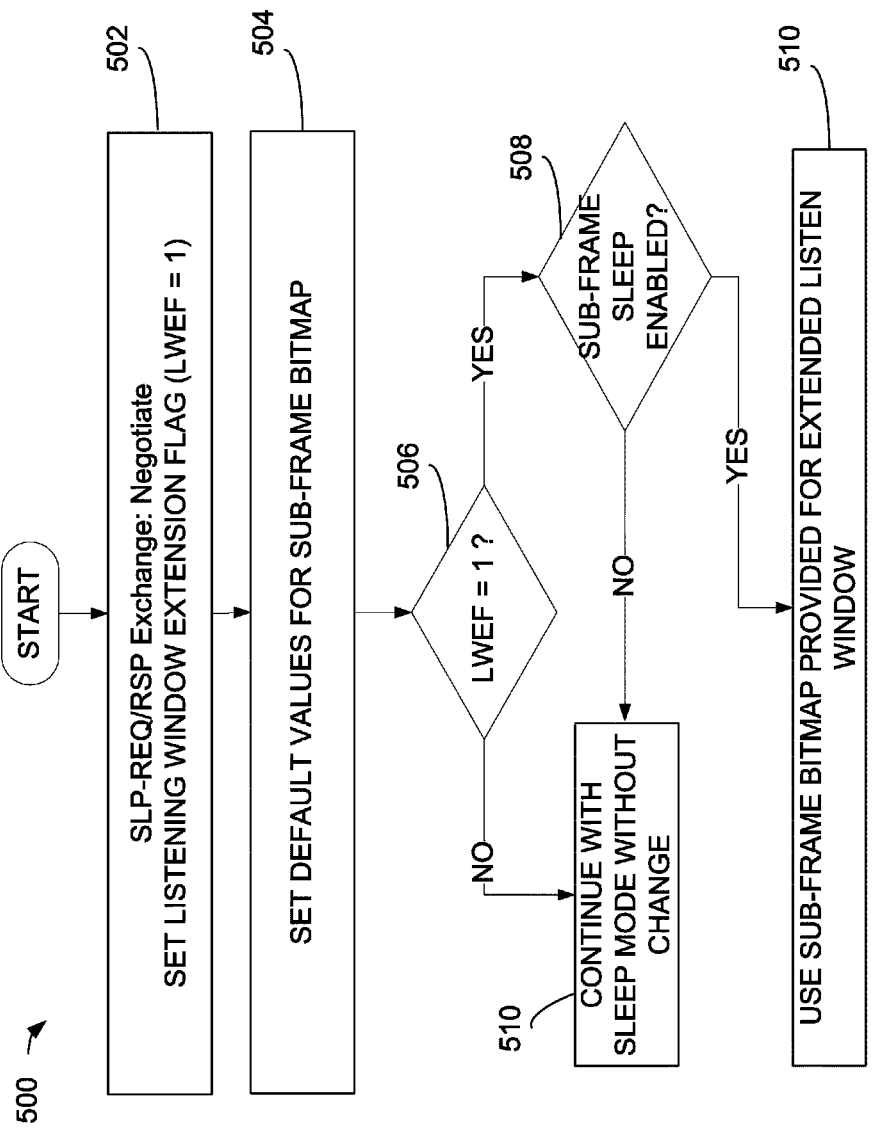
FIG. 6 illustrates a method for implementing a communication mechanism using over the air IEEE 802.16m messages in accordance with some example embodiments.

FIG. 6 is a flow chart of a procedure 500 for indicating from the MS to the BS specifics of a Listen Window extension. As illustrated, operation 502 is the initial negotiation between the BS and MS, where a Sleep Request and Response (SLP-REQ/RSP) messaging is communication. The operation 502 includes setting up of the options for sub-frame Sleep mode during both the default and the extended Listen Window. This further includes setting up bitmaps defining each. Listen Window operation 504 then looks for conditions where Sleep Window is to be extended and whether sub-frame Sleep for both default and extended Listen Window is enabled. If so, then operation 504 assigns the negotiated pattern in bitmap form to optimize sleep in sub-frames where the MS will sleep during specific sub-frames during a transmission. In operation, when LWEF=1, decision diamond 506, and if sub-frame sleep is enabled, decision diamond 508, then operation 510 defines a sub-frame bitmap for extension of the Listen Window. If LWEF=0, decision diamond 506, and if sub-frame sleep is not enabled, decision diamond 508, then the device continues with Sleep mode without change, operation 510.

Figure 7:
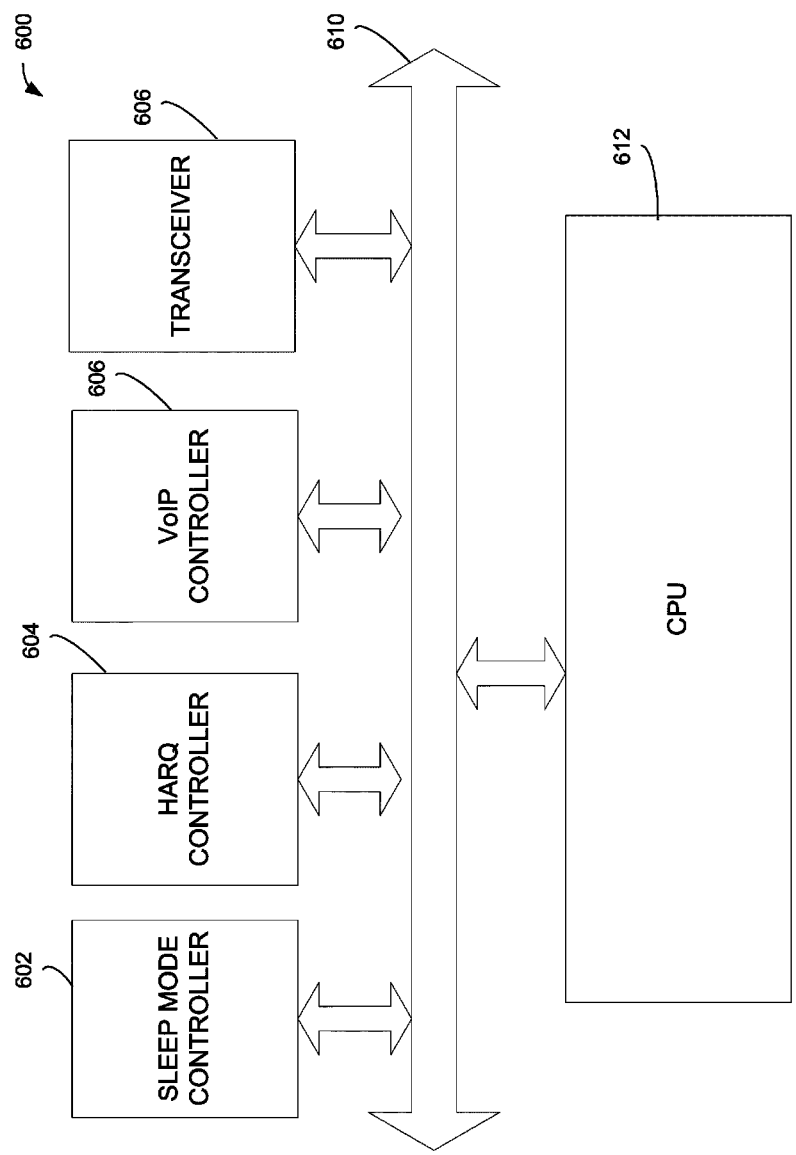
FIG. 7 illustrates a communication device for implementing power saving in accordance with some example embodiments.

FIG. 7 illustrates a wireless communication device 600 performing the sleep mode optimizations described hereinabove. Central Processing Unit (CPU) 612 is coupled to bus 610 for control of device 600. Transceiver 606 communicates with a network wirelessly, and is coupled to the bus 610, which may be any of a variety of mechanisms for communication within device 600. Operation of device 600 to support a wireless protocol standard, including IEEE 802.16m, is provide by a various controllers, some of which are illustrate in FIG. 6. The controllers may be implemented as instructions stored on a computer-readable medium, circuitry, or a combination thereof. As illustrated, a sleep mode controller 602 coupled to bus 610 identifies the sub-frames for sleep and those for an extended Listen Window. The HARQ controller 604 and the VoIP controller 606 are further coupled to the bus 610, each for controlling the respective operations. Other embodiments may have alternate configurations to implement the methods described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A wireless communication device supporting a communication protocol having a plurality of sub-frames for each data frame, comprising:
a central processing unit;
a transceiver; and
a sleep mode controller adapted to enable Sleep mode for sub-frames in a Listen Window extension, wherein the Listen Window extension is pre-configured so that the wireless communication device is awake during at least one sub-frame of at least one frame of the Listen Window extension and sleeps during at least one other sub-frame of the at least one frame of the Listen Window extension.

2. The wireless communication device of claim 1, further comprising:
an HARQ controller, wherein the sleep mode controller determines that there is the at least one frame for the Listen Window extension based on the HARQ status from the HARQ controller.

3. The wireless communication device of claim 2 wherein when the HARQ status identifies a retransmission, the sleep mode controller extends the Listen Window to maintain an awake state for the retransmission.

4. The wireless communication device of claim 2 wherein the sleep controller applies a predetermined pattern for Sleep mode during sub-frames of a transmission.

5. The wireless communication device of claim 1, wherein the communication protocol is an I.E.E.E. 802.16m standard protocol.

6. The wireless communication device of claim 5 wherein each frame is 20 ms, having 8 sub-frames, and
wherein the sleep mode controller negotiates a bitmap with a communication network indicating the at least one sub-frame during which the device is active during the extension of the Listen Window.

7. The wireless communication device of claim 1 wherein the sleep mode controller identifies a first number of sub-frames as the Listen Window, and a second number of sub-frames as a Sleep Window, and the extension of the Listen Window extends into the Sleep Window.

8. The wireless communication device of claim 7 wherein in response to an HARQ retransmission the sleep mode controller sends a transmission signaling message to a communication network.

9. The wireless communication device of claim 1 wherein the communication device is awake during the Listen Window and the at least one sub-frame of the Listen Window extension.

10. The wireless communication device of claim 1, wherein the sleep mode controller enables Sleep mode for a Sleep Window and instructs the device to wake for the Listen Window.

11. A method for a wireless communication device supporting a communication protocol having a plurality of sub-frames for each data frame, comprising:
negotiating a first set of frames for a Listen Window and a second set of frames for a Sleep Window; and
negotiating a configuration for extension of the Listen Window into the Sleep Window,
wherein the Listen Window extension is pre-configured so that the wireless communication device is awake during at least one sub-frame of at least one frame of the Listen Window extension and sleeps during at least one other sub-frame of the at least one frame of the Listen Window extension.

12. The method as in claim 11, wherein negotiating a configuration for extension of the Listen Window further comprises:
negotiating a first configuration for default operation; and
negotiating a second configuration for retransmission of data.

13. The method of claim 12 wherein the second configuration corresponds to a VoIP transmission status.

14. The method of claim 12 wherein the second configuration corresponds to an HARQ status indicating retransmission of data, and the second configuration indicates to remain awake for a next data frame to complete the retransmission.

15. The method of claim 14, wherein the first configuration has a corresponding first bitmap designation and the second configuration has a corresponding second bitmap designation.

16. The method of claim 11, further comprising setting a default sub-frame bitmap, the default sub-frame bitmap identifying sub-frames for the wireless communication device to listen for communications on a Down Link (DL).

17. The method of claim 16, further comprising setting a Listen Window Extension Flag (LWEF) to indicate the extension of the Listen Window into the Sleep Window.

18. The method of claim 17, further comprising setting a Listen Window extension sub-frame bitmap, the Listen Window extension sub-frame bitmap identifying the at least one sub-frame for the wireless communication device to sleep during the extension of the Listen Window.

19. A non-transitory computer-readable medium, comprising:
a first set of instructions stored on the non-transitory computer-readable medium to control wireless operation of a wireless communication device supporting a communication protocol having a plurality of sub-frames for each data frame;
a second set of instructions stored on the non-transitory computer-readable medium to receive instructions to implement a first set of frames for a Listen Window and a second set of frames for a Sleep Window in transmissions between the wireless communication device and a network; and
a third set of instructions stored on the non-transitory computer-readable medium to receive instructions to implement an extension of the Listen Window into the Sleep Window, and to designate in advance at least one sub-frame of at least one frame of the Listen Window extension for the wireless communication device to be awake and at least one other sub-frame of the at least one frame for the wireless communication device to sleep.

20. The non-transitory computer-readable medium as in claim 19, further comprising:
a fourth set of instructions stored on the non-transitory computer-readable medium to negotiate a first configuration for default operation; and
a fifth set of instructions stored on the non-transitory computer-readable medium to negotiate a second configuration for retransmission of data.

* * * * *